United States Patent [19]
Baxter

[11] Patent Number: 5,741,419
[45] Date of Patent: Apr. 21, 1998

[54] FILTER PRESS FOR FILTERING LIQUID SLURRIES

[75] Inventor: Thomas D. Baxter, Greenville, Miss.

[73] Assignee: Environmental Treatment Facilities Inc., Greenville, Miss.

[21] Appl. No.: 719,962

[22] Filed: Sep. 24, 1996

[51] Int. Cl.⁶ .................................................. B01D 25/127
[52] U.S. Cl. .......................... 210/227; 210/230; 210/400; 210/416.1; 210/445; 210/450; 210/455
[58] Field of Search ...................... 210/107, 138, 210/224–227, 229–231, 387, 400, 445, 450, 416.1, 455; 100/196–198, 291

[56] References Cited

U.S. PATENT DOCUMENTS

| | | |
|---|---|---|
| 46,785 | 3/1865 | Dunning . |
| 2,771,194 | 9/1956 | Baxter . |
| 3,121,681 | 2/1964 | Baxter .................................. 210/400 |
| 4,155,830 | 5/1979 | Sukhobrusov et al. . |
| 4,549,719 | 10/1985 | Baumann . |
| 5,198,123 | 3/1993 | Stover et al. . |

FOREIGN PATENT DOCUMENTS

62-644497 3/1987 Japan ..................................... 210/400

*Primary Examiner*—Matthew O. Savage
*Attorney, Agent, or Firm*—Donald C. Casey, Esq.

[57] ABSTRACT

An apparatus for filtering a liquid slurry is described. The apparatus uses a pair of filter chambers formed by a pair of fixed plates, and a pair of opposed moveable plates. The moveable plates are moved into engagement with the fixed plates by the downward movement of a wedge member disposed between the plates and, the plates are bias so that when the wedge member is withdrawn, the plates will be drawn together opening the filter chambers. The chambers are sealed by opposed arcuate gaskets so that the sealing action is achieved by internal pressure rather than the pressure driving the plates together. A filter media is provided on a continuous roll which extends between the gaskets and is intended to carry the filter cake out of the chamber when the plates are separated whereupon the cake will be dropped from the filter media into a collection area so that the filter media can be reused.

14 Claims, 6 Drawing Sheets

FILTER PRESS FOR FILTERING LIQUID SLURRIES

FIELD OF THE INVENTION

This invention relates to a filter for removing solids from a liquid slurry in the form of a filter cake and for collecting the filter cake. The invention also includes a method for efficient filtering to maximize solids removal from a liquid slurry in a given time period.

DESCRIPTION OF THE PRIOR ART

Industrial filtering apparatus such as filter presses, have been in use for many years to remove a variety of different solids from liquid slurries. Such filters typically operate under a constant pressure or under an increasing pressure. In both situations, typically, a point is reached when efficiency requires that the filtering process must be stopped so the apparatus can be cleaned to remove and collect the cake. In a constant pressure process, back pressure remains constant and as the filter cake builds on the filter the flow rate therethrough drops. In the increasing pressure mode of operation, as the filter cake builds the back pressure increases in an attempt to keep a relatively constant flow through the filter. A point is reached, however, in both processes when the apparatus must be shut down and the cake removed from the filter.

In the constant pressure mode, the filter process is stopped more frequently to remove cake than in the increasing pressure mode and therefor efficiency will depend upon the time necessary to remove the cake before the apparatus is up and running again. The time necessary to remove the cake is important also in the increasing pressure mode, as is the cost of the increased pressure requirement to maintain a longer period of constant flow through the apparatus.

In my prior U.S. Pat. No. 2,771,194 there is described a process for filtering wherein the filter cycle is of relatively short duration, thereby permitting the depositing of only a relatively thin filter cake. It was found, and described therein, that this method permits the filtration of much larger quantities of suspension bearing liquids in a given time. The method is equally applicable to removing suspended particles from a liquid carrier or to removing liquid from a slurry. It was described therein that improved efficiency was found when the filter cloth is operating in a submerged situation with a minimum of compaction of the filter cake thereon. Pressure was removed to stop the filtering process even if the filter cloth had not yet become saturated and was still filtering at a good rate so that the filter cake would not be subjected to compacting pressure. The filter is intended to be submerged so that pressure is applied exclusively to the slurry to be filtered and not the cake accumulated on the filter.

As a result, the filter cloth can be quickly and efficiently cleaned by scrapping or any other suitable method so that the apparatus can be returned quickly to operation. It was found that a moist condition facilitated rapid removal of the filter cake, in contrast to a compacted condition often found in filtering systems in which filtering is continued until an over pressure is applied to the cake itself to compress and harden the same. While the cake collected is relatively moist, it can be dried while the filtering process is resumed whereas if the filter cake has been compacted, considerable time will be required to remove it from the filter cloth or screen. In the latter situation down time of the apparatus will be greatly increased.

In order to evaluate efficiency whether the mode is constant pressure or increasing pressure the total cycle time must be considered, and this includes the time necessary to remove from the pressure chamber, excess slurry that is not part of the deposited cake on the filter media, the time necessary to disengage the pressure chamber from the filtrate chamber, the time necessary to remove the deposited cake either manually or mechanically and the time necessary to reassemble the apparatus and fill the pressure chamber so that filtering can resume.

It is desirable then to provide a filtering apparatus wherein the pressure chamber can be engaged and disengaged quickly and with a reliable seal and, the filter cake similarly quickly and efficiently removed. Toward this end, it is necessary that the pressure chamber be engaged and disengaged from the filter media so that when engaged there will be an automatic seal created which will be locked in a fail safe mode until disengaged.

While it is known to use a wedge mechanism in a press situation as shown, for example, in U.S. Pat. No. 46,785, and in U.S. Pat. No. 4,549,719, this type of structure is not known to be adapted to a filter press. In addition, while a gasket mechanism utilizing an arcuate seal is shown in U.S. Pat. No. 5,198,123 and a pair of opposed rollers mounting filter media cloth are known in a variety of applications such as U.S. Pat. No. 4,155,830, these structural features have not been known to be adapted as component parts of an efficient slurry filtering system.

SUMMARY OF THE INVENTION

It is necessary to design a filter apparatus then wherein the disengagement of the pressure chamber, removal of the deposited cake from the media, and re-engagement of the pressure chamber are efficiently carried out. The seal or gasket must not be so designed that the energy used to engage the pressure chamber creates the seal. Since the filter media must pass through the seal, the seal must occur using pressure inside the pressure chamber. Furthermore, the energy source for engaging the pressure chamber should also lock the chamber in a fail safe mode at the same time.

The process of this invention maximizes the efficiency by using pressure filtering, a short cycle, and thin pressure cakes. Based upon this process then the time consumed by engaging and disengaging the pressure chamber due to the preferred short time of the filtration phase is very important.

The filter of this invention then incorporates opposed filter plates spaced apart in pairs and separated by a piston driven wedge. The filter plates further are biased against the wedge action so that as the wedge is driven between a pair of filter plates, it will drive the plates together, and a vertical surface is provided on the wedge member, opposed to each filter, to achieve simultaneous locking. When the wedge is withdrawn, the filter plates automatically open by spring action. Accordingly, each filter consists of two sections, a vertical filtering segment which is movable by action of either the springs or the wedge, and a filtrate segment which is fixed and which mounts the filter media in the form of preferably a screen with a section of an endless roll of filter cloth stretched thereover. The cake is intended to accumulate on the filter cloth and then, when the two segments open, the filter cloth is rotated carrying the cake out of the filter for collection. The two segments have a peripheral arcuate gaskets so that when the segments come together, the gaskets join only at a single point to form the seal. Because, in the closed position, the plates are locked together, contact only between the gaskets is necessary and internal pressure against the gaskets then provides the seal.

When the slurry then is admitted to the filtering segment, cake builds on the filter media and the liquid is drawn off through the filtrate section. The filter media itself, is an endless roll passing between the two segments, and the roll is intended to be rotatably driven so that when the filter media is rotated the cake will be carried therewith out of the filter and to a discharge station onto a conveyor or the like.

Accordingly, it is an object of this invention to provide a filter apparatus for efficiently separating solids from a liquid carrier which is adaptable to a wide variety of different industrial filtering uses.

It is another object of this invention to provide a filter apparatus wherein pairs of vertical filter plate segments are separated by a wedge member which is piston-driven to either close the segments against each other, or when withdrawn, permit opening of the filter segments.

It is a further object of this invention to provide a filter apparatus wherein opposed vertical filter plates are sealingly engaged when closed against each other by arcuate peripheral gasket on each plate whereby the internal pressure during a filtering procedure will assist in maintaining the seal between the plates.

It is a further object of this invention to provide a filter apparatus system wherein the time necessary to open the filter plates, withdraw the filter cake accumulated and replace it with new filter media from a continuous roll, and subsequently close the filter plates to resume filtering will be minimized.

It is a further object of this invention to provide a filter apparatus useful in a process with short filtering times, thin cakes, and a minimal time for removing the cake to efficiently utilize a constant pressure mode of operation in the separating of liquids and solids.

These and other objects will become readily apparent with reference to the drawings and following description wherein:

DETAILED DESCRIPTION OF THE INVENTION

Figure 1:
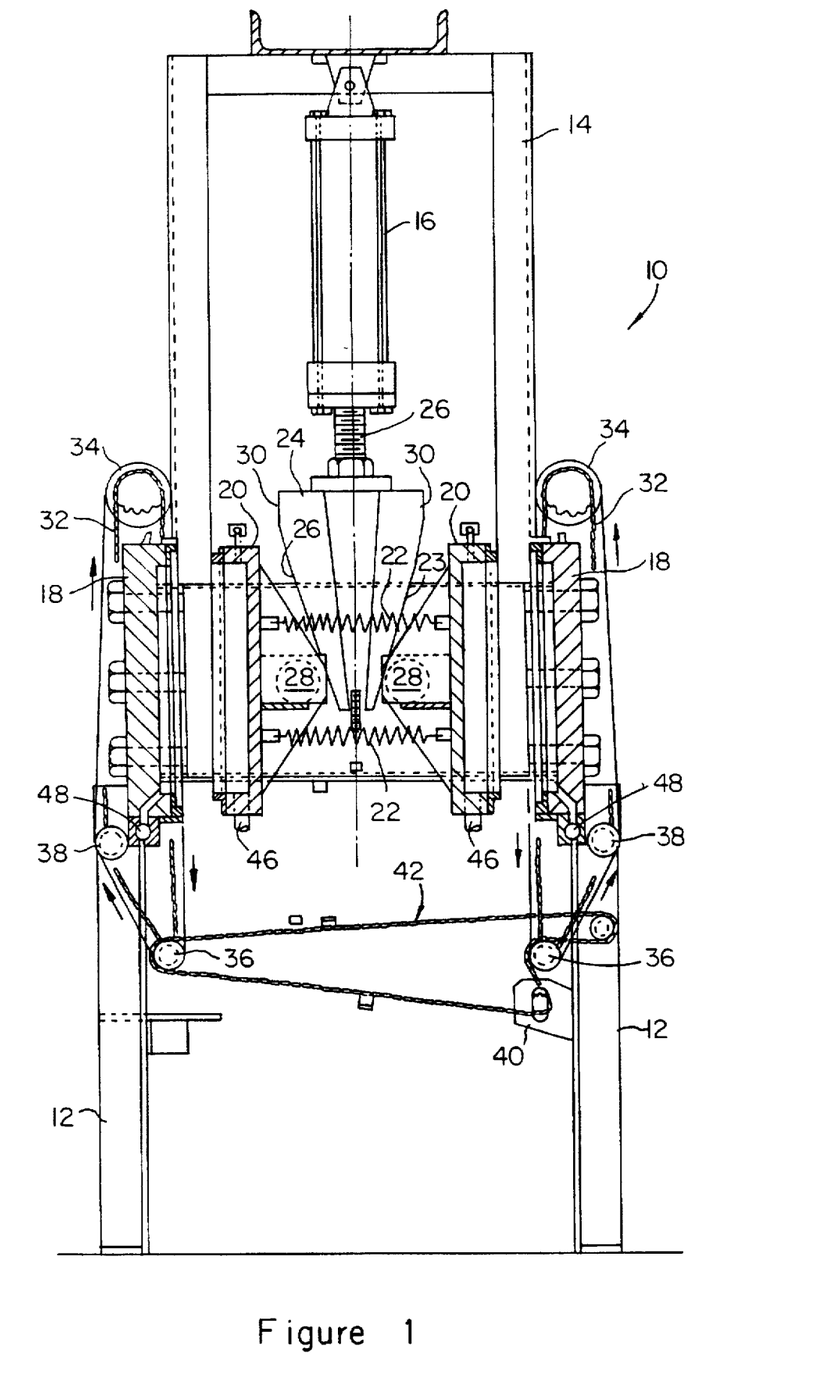
FIG. 1 is a side view of the apparatus of this invention taken along lines 11 of FIG. 3.
Figure 2:
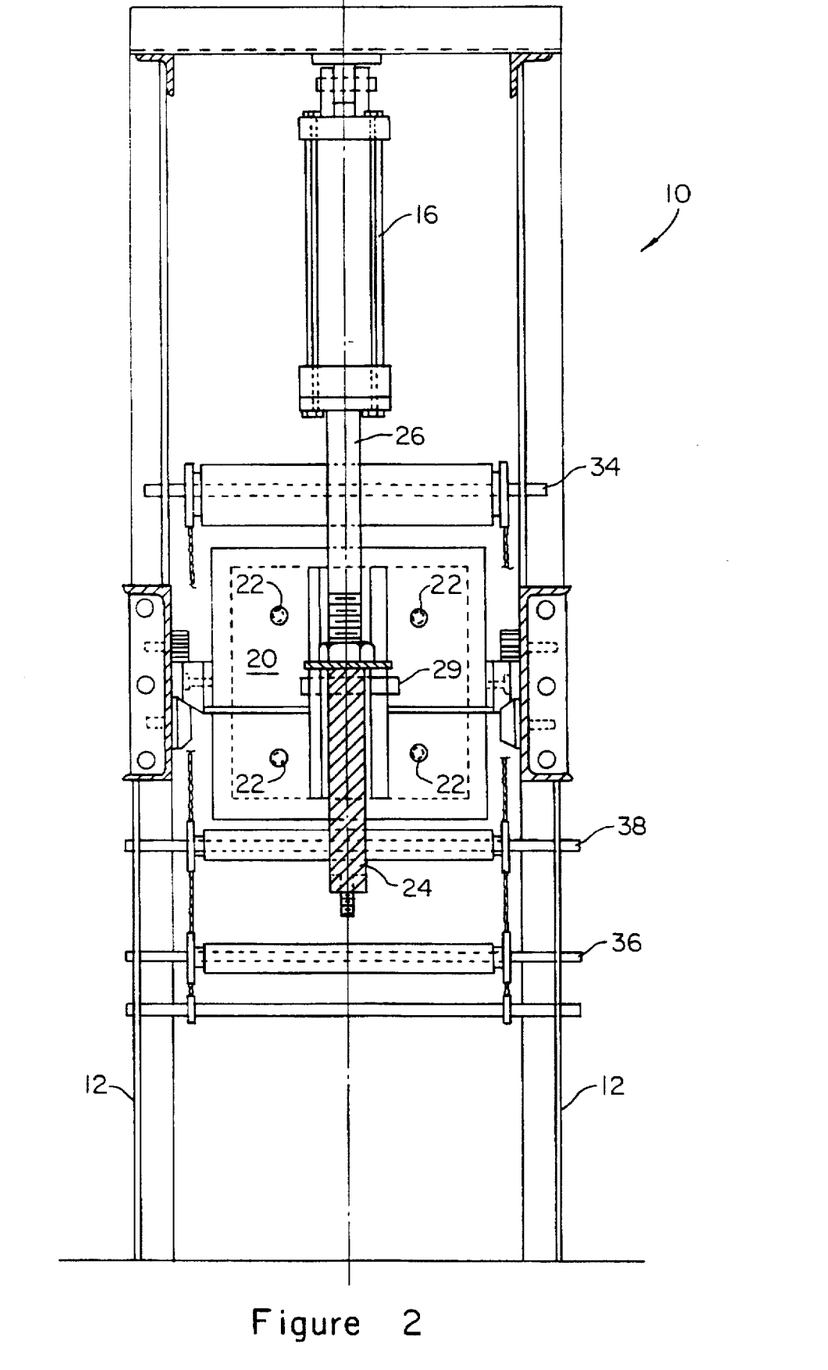
FIG. 2 is an end view of the apparatus of this invention taken along lines 22 of FIG. 3.
Figure 3:
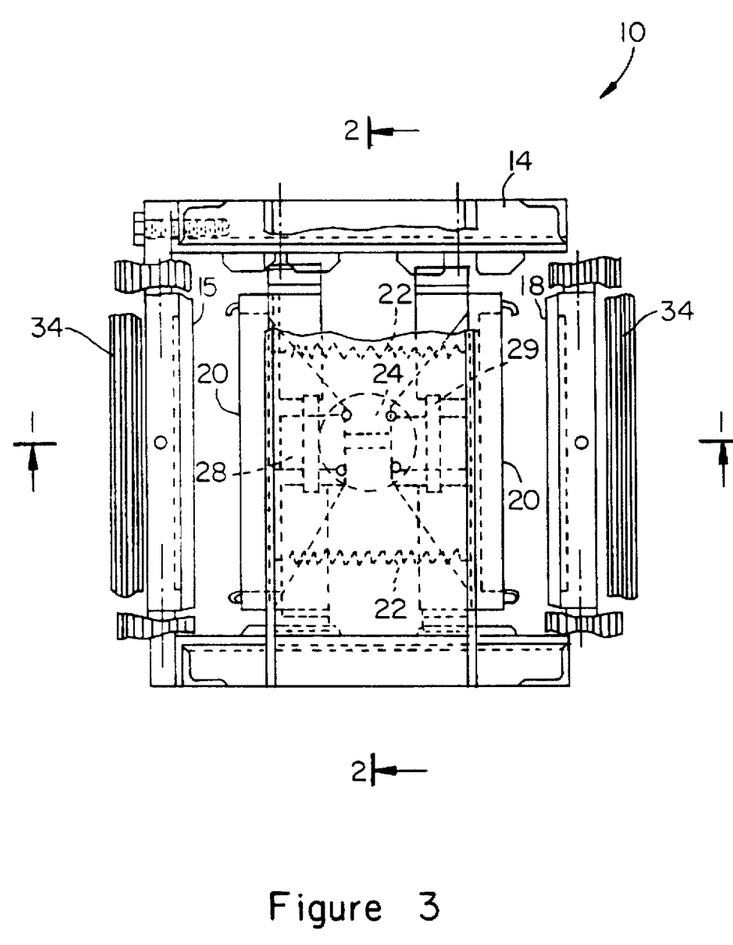
FIG. 3 is plan view of the apparatus of FIGS. 1 and 2.

With attention to the drawings and to FIGS. 1–3 in particular, there is shown a filter apparatus 10 of this invention. It is to be understood that an installation would typically include many of said structures, 10, in series, preferably. For purposes of illustration only a single apparatus 10, shown in FIGS. 1–3, will be described.

The filter structure 10 includes support legs 12 and an overhead yoke 14 which supports a piston 16. The filter itself consists of outer filtrate plates 18 which are affixed to the structural support 12 and 14 and movable inner filtrate plates 20 which are interconnected by springs 22 so that they are biased in the open position shown in FIG. 1. The filter plates 20 are brought into closure contact with the plates 18 by the downward movement of wedge member 24 which in turn is controlled by piston 16 through rod 26.

Wedge member 24 has an inclined surface 25 on either side thereof which normally rides on roller bearing assemblies 28 which in turn are affixed to plates 20. Therefor as the wedge member 24 travels downwardly as shown in FIG. 1, the plates 20 will be driven outwardly, into contact with plates 18, to close a pair of filter assemblies.

It should be noted that a vertical surface 30 is also provided on each side of wedge member 24 so that at the bottom of the downward movement of wedge member 24 relative to roller bearings 28 the vertical surfaces 30 will act to lock the plates 18 and 20 together. With attention to FIG. 2, in that figure the wedge member 24 is at its downward position whereby plates 20 and 18 (not shown) are closed against each other.

With attention to FIG. 1, when the rod 26 is withdrawn into piston 16 to raise the wedge member 24 the springs 22 will withdraw plates 20 away from plates 18 to open the filters. The opposed vertical surfaces 30 against bearings 28 serves as a fail safe lock to maintain the filter plates 18 and 20 closed against each other.

The filter media 32 is on an endless roll which extends between rollers 34 above the filter assemblies and lower rollers 36 therebelow with intermediate rollers 38 being provided as shown in FIG. 1. During operation, when the plates 18 and 20 are separated, the chain drive 40 will drive a chain 42 to rotate rollers 36 and in turn rollers 34 and 38 and to thereby cause the filter media 32 to translate downwardly in the direction shown by the arrows in FIG. 1. When the filter cake, carried by the media 22 reaches rollers 36 it will fall below to a conveyor (not shown) for further processing.

It should be noted that the roller assembly 28 is not shown in FIG. 2 but rather the roller pin 29 only. In addition, the chain 42 and drive therefor 40 has been deleted from this view.

With further attention to FIG. 1, slurry to be filtered is admitted under pressure through passage 46 in filtering plate 20 and the filtrate liquid is removed through the passage 48 in filtrate plate 18.

Figure 4:
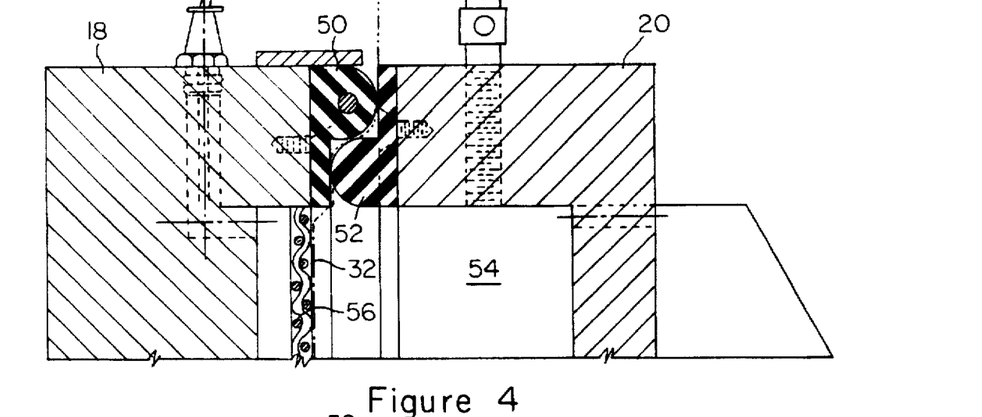
FIG. 4 is fragmentary cross-sectional view of the upper gasket sealing between opposed filter segments.
Figure 5:
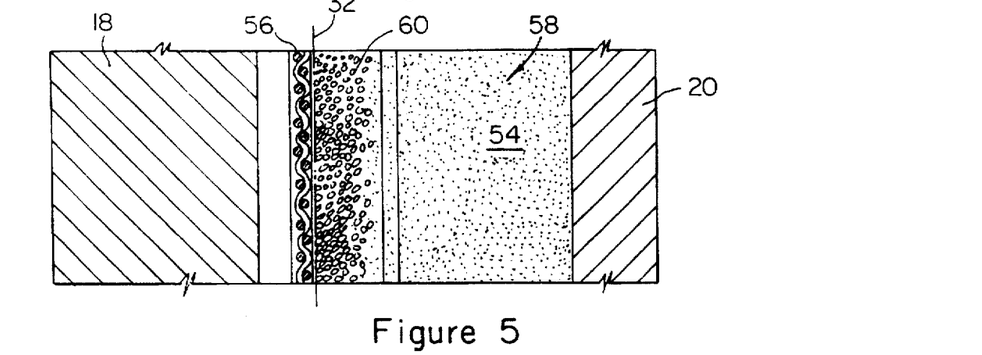
FIG. 5 is a fragmentary cross-sectional view of the central portion of the filter illustrating cake buildup on the filter media.
Figure 6:
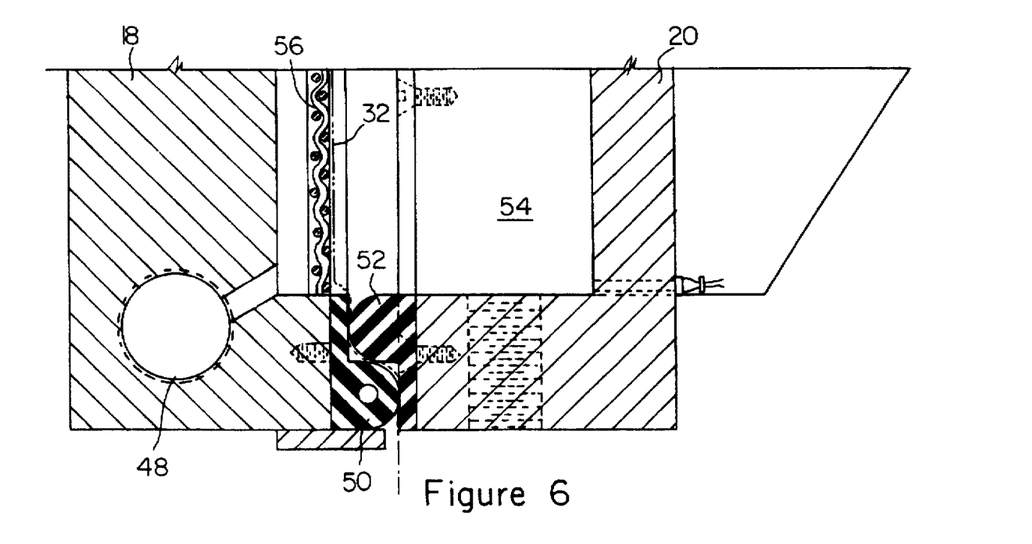
FIG. 6 is a fragmentary cross-sectional view similar to FIG. 4 showing the lower gasket construction.

With attention to FIGS. 4, 5 and 6, the peripheral area of plates 18 and 20 are used to mount, respectively, opposed arcuate gaskets 50 and 52. As shown in the drawings, the arcuate gaskets 50 and 52 abut the opposite plate and gasket member at single tangential points along the periphery. It is necessary only that wedge member 24 push the plates together so that the tangential points of contact meet between gaskets 50 and 52 and between such gaskets and opposite plates. Thereafter internal pressure within the chamber 54 will effect the seal by wedging gasket 52 into gasket 50, deforming the same between plates 18 and 20.

The filter media 32 extends between gaskets 50 and 52 and across a supporting mesh 56 of stainless steel which is mounted within plate 18.

Figure 8:
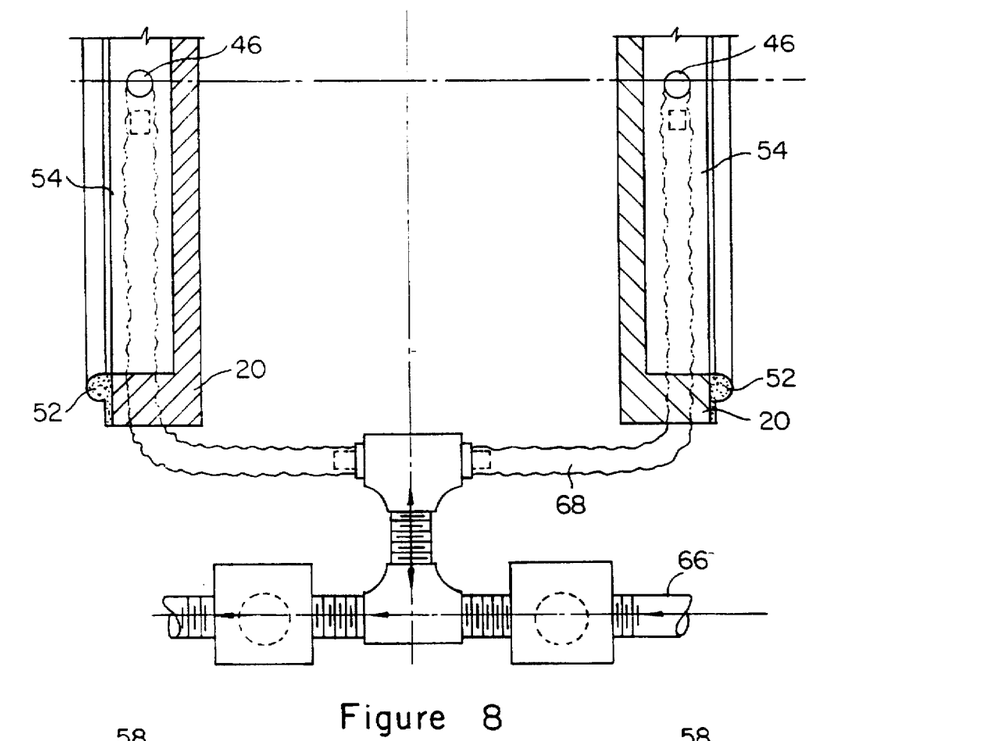
FIG. 8 is a fragmentary cross-sectional view illustrating the slurry feed to a pair of filter segments.
Figure 9:
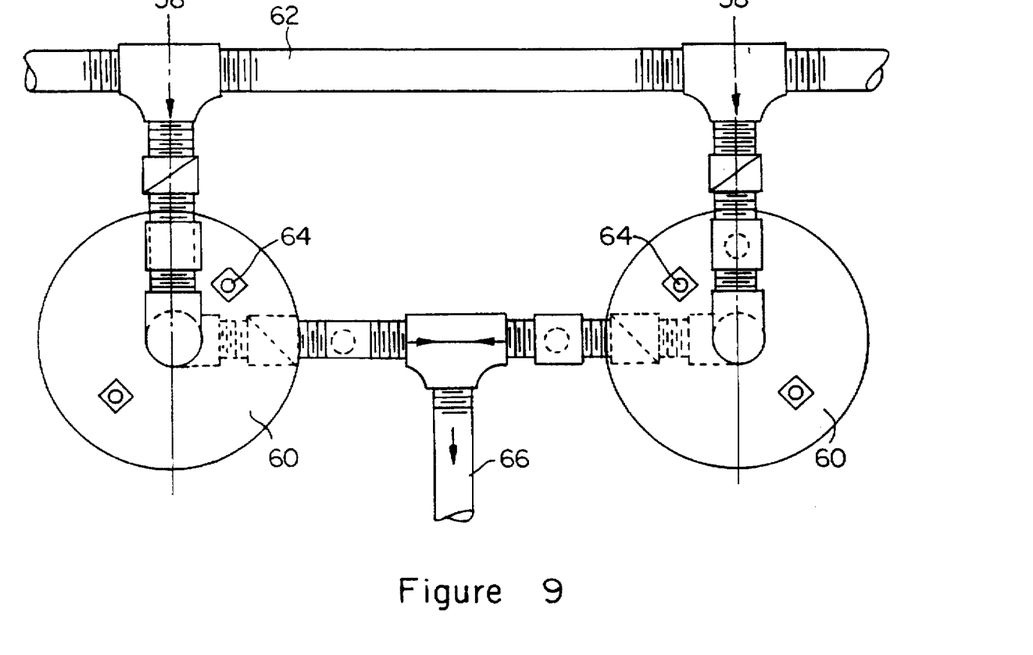
FIG. 9 is a fragmentary view of opposed slurry pressure tanks used to supply slurry to be filtered to the feed segments shown in FIG. 8.

When a slurry 58 is admitted into chamber 54 formed between plates 18 and 20 a cake 60 will build against the filter media 32 responsive to the over pressure on the slurry side of the filter media 32. The liquid passing through the filter media 32 will then leave plate 18 through outlet 48. Typically, the slurry is pressurized before being admitted to the chamber With attention to FIGS. 8 and 9, pressure chamber 60 are supplied with slurry 58 through piping 62. The chambers 60 are then pressurized through ports 64 with compressed air, and the pressurized slurry 58 is then piped through conduit 66 to a conduit 68 which in turn is in communication with the ports 46 through plates 20 into the interior chambers 54.

As will be obvious to those skilled in the art, the means for conveying the slurry and pressurizing the same is within the skill of an ordinary practioner in the art and this invention is not intended to be limited to the means shown. The means shown herein is illustrative rather than limitive.

Figure 7:
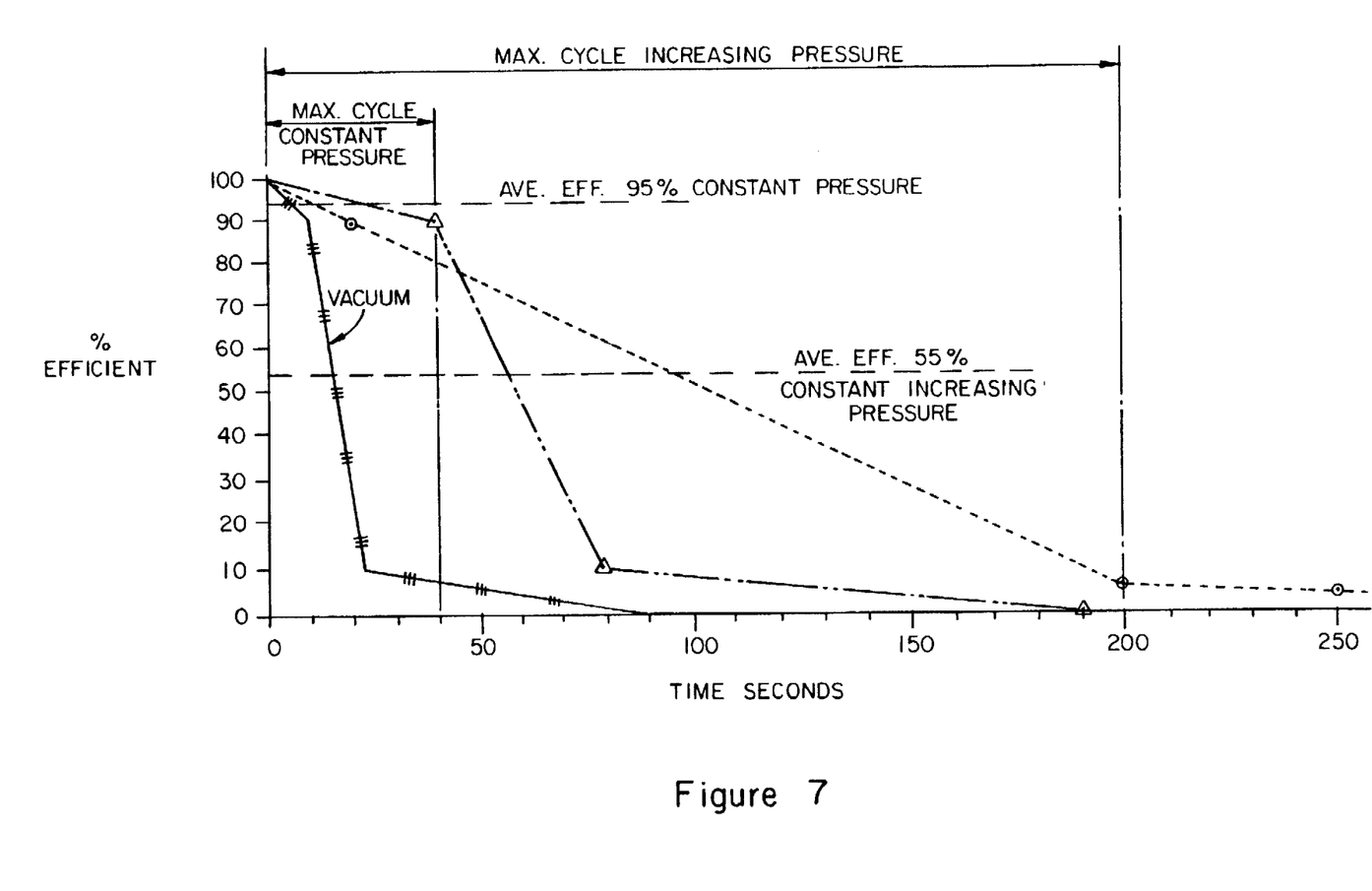
FIG. 7 is a graph illustrating efficiency versus filter time for typical constant pressure and increasing pressure cycles of operation.

With attention to FIG. 7, the filtering phase of a total cycle is based on a filtration curve and FIG. 7 is a typical filtration curve. It has been discovered that the filtration phase is governed by the compressive strength of the material to be filtered. The lower the compressive strength of the material the shorter the filtering phase of the total cycle. It is imperative that at no time must pressure in excess of the compressive strength of the material be applied unless material is completely submerged in a liquid. In other words, the filter cake 60 formed in chamber 54 against filter media 32 must be completely submerged in the liquid in slurry 58 since slurry 58 is under pressure and if the filtrate flow begins to drop the material adjacent the filter media will only be partially submerged as the filtrated side will not be full of liquid. At this point, or more accurately before this occurs, the process must be shut down, the plates opened, and the filter media 32 rotated out of the filter to carry the accumulated cake downwardly for collection.

The length of the filtering phase of the total cycle can best be dictated by the quantity of the filtrate flow. The material adjacent to the filter media will become only partially submerged as the cake increases in depth. When the percentage of collapsed material reaches a certain point, based on the filtration curve, the flow will drop suddenly. This is the end of the filtering phase of the total cycle.

The filtering curve, however, will change depending upon the characteristics of the particles to be filtered. Furthermore, if the filtrate plate is not flooded, the particles within the cake 60 adjacent the filter media 32 will not be completely submerged in liquid and will then collapse or smear. These particles will be greatly reduced in their filter ability characteristics and will affect the filter media 32 if it is to be reused.

As shown in FIG. 7, the constant pressure maximum cycle, the point at which efficiency drops dramatically, is achieved in a short period of time, in this example, at about 40 seconds. If the process is shut down at that point efficiency is at 95% for a short time cycle. In contrast, on a constant increasing pressure, the shut down will not occur until about 200 seconds. This leaves an average efficiency, however, at about 55%. If the machinery used can clear the cake, from the pressure chamber and re-pressurizes the system for re-filtering quickly enough, the constant pressure system should be able to achieve much better results than the constant increasing pressure system. The device of this invention is intended to facilitate that.

In summary, a pressure filtering apparatus is disclosed wherein opposed pressure chambers are formed by moveable plates which are simultaneously moved to engaged fixed plates by the downward movement of a wedge member and are opened to move away from the fixed plates by upward movement of the wedge member in combination with biasing springs which interconnect the plates. Filter media on a continuous roll is intended to extend from a roller above the filter plates through and between the filter plates and downwardly to a roller below the plates so that cake collected on the filter media can rotate downwardly through the pressure chamber to the lower roller whereupon it will be expelled for collection and the filter media reused.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

I claim:

1. A liquid slurry filter apparatus for separating a liquid from solids entrained therein comprising: a frame;

a pair of mutually spaced filter assemblies each filter having a fixed, outer plate mounted on said frame and a movable, inner plate, said inner plates movable into and out of engagement with said fixed plates; bias means interconnecting said inner plates and normally urging said plates out of engagement with respective outer plates; movable wedge means supported by said frame and disposed between said pair of inner plates for driving said inner plates into engagement with said outer plates to assemble said filters and releasable locking means carried by said wedge means for blocking movement of said inner and outer plates out of engagement with each other;

filter media cloth extending between each of said inner and outer plates and means for advancing said cloth along a path of travel between said inner and outer plates when said plates are out of engagement with each other; and means for introducing said slurry into said assemblies, means for forcing said slurry under pressure against said filter cloth to separate solids and liquid therein and means for removing said separated liquid and solids therefrom.

2. The filter apparatus of claim 1 wherein said inner and outer plates have surrounding peripheral edges, said apparatus further comprising gasket means mounted on the edges of adjacent faces of said inner and outer plates including means for sealing said peripheral edges when said plates are in engagement to form a filter chamber therebetween and for maintaining said seal responsive to the pressure therein and not the driving of said plates into engagement by said wedge means.

3. The apparatus of claim 2 wherein said gasket means is a flange extending perpendicularly inwardly from each of said inner and outer plates toward the other of said pair of plates, each flange mounting a gasket thereon.

4. The apparatus of claim 2 wherein said sealing means includes a gasket mounted on each of said plate edges said gasket having an arcuate bead portion and an integral seat portion adjacent thereto.

5. The apparatus of claim 4 wherein the bead portion of the gasket on said inner plate is in registration with the seat portion of the gasket on said outer plate.

6. The apparatus of claim 5 wherein when said plates are in engagement each bead abuts an opposite seat.

7. The apparatus claim 1 wherein said pair of assemblies comprises two pairs of parallel plates and said bias means includes a plurality of coil springs interconnecting adjacent inner faces of said movable plates.

8. The apparatus of claim 7 wherein said wedge means comprises a wedge having opposed inclined faces extending from an inter-section thereof to opposed faces contained in planes disposed parallel to said plates and piston means coupled to said wedge for moving the same in a direction parallel to said plates.

9. The apparatus of claim 8 further comprising gasket means surrounding adjacent faces of said inner and outer plates.

10. The apparatus of claim 9 wherein said gasket means includes a flange extending around each adjacent face to form, when said faces are abutting, a pressure chamber therebetween sealed by said gasket means.

11. The apparatus of claim 10 wherein said filter cloth normally extends through said pressure chamber dividing it into a filtering portion and a filtrate portion.

12. The apparatus of claim 11 wherein said filter media cloth is an endless belt and said apparatus comprises rollers disposed above and below each of said inner and outer plates, said rollers supporting said endless belt so that one run thereof extends between each pair of said inner and outer plates and said means for advancing is coupled to one of said rollers.

13. The apparatus of claim 12 further comprising discharge means disposed below said plates and coupled to said belt for removing accumulated solids therefrom as said belt advances.

14. The apparatus of claim 11 further comprising a support screen disposed across the filtrate portion of said chamber adjacent said belt and mounted on said fixed plate.

* * * * *